United States Patent [19]

Hampel

[11] 4,397,088

[45] Aug. 9, 1983

[54] POWER EQUIPMENT UNIT WITH SPLIT HANDLE

[75] Inventor: Wilbur J. Hampel, Spring Park, Minn.

[73] Assignee: The Toro Company, Minneapolis, Minn.

[21] Appl. No.: 232,450

[22] Filed: Feb. 9, 1981

[51] Int. Cl.³ .......................................... H01D 50/00
[52] U.S. Cl. .................................. 30/296 R; 285/419; 403/312
[58] Field of Search .................... 30/296 R, 122, 276; 285/419; 403/312, 306; 16/111 A, 111 R, 115

[56] References Cited

U.S. PATENT DOCUMENTS

| | | | |
|---|---|---|---|
| 4,122,601 | 10/1978 | Katsuya | 30/276 |
| 4,132,489 | 1/1979 | Berg | 16/115 |
| 4,347,880 | 9/1982 | Merwe | 30/296 R |

FOREIGN PATENT DOCUMENTS

| | | | |
|---|---|---|---|
| 815096 | 9/1951 | Fed. Rep. of Germany | 403/312 |
| 583135 | 10/1958 | Italy | 403/312 |

Primary Examiner—Jimmy C. Peters
Attorney, Agent, or Firm—James W. Miller

[57] ABSTRACT

A power equipment unit (2) comprises a housing (4) having an active element (6), a drive unit (14) for the active element (6) and an upwardly extending handle assembly (16). Handle assembly (16) comprises upper and lower handle tubes (18 and 20) which are clamped together by semi-circular sleeves (42) and (44). Threaded fasteners (48) clamp the sleeves together around the mating ends (30 and 32) of the handle tubes with the fasteners (48) being located entirely outside of the handle tubes. Lugs (46) on each of the sleeves (42) and (44) extend inwardly through aligned apertures (34 and 36) in the mating ends (30 and 32) of the handle tubes (18 and 20) but stop short of interferring with a power supply cord (26) extending downwardly through the tubes (18 and 20).

6 Claims, 3 Drawing Figures

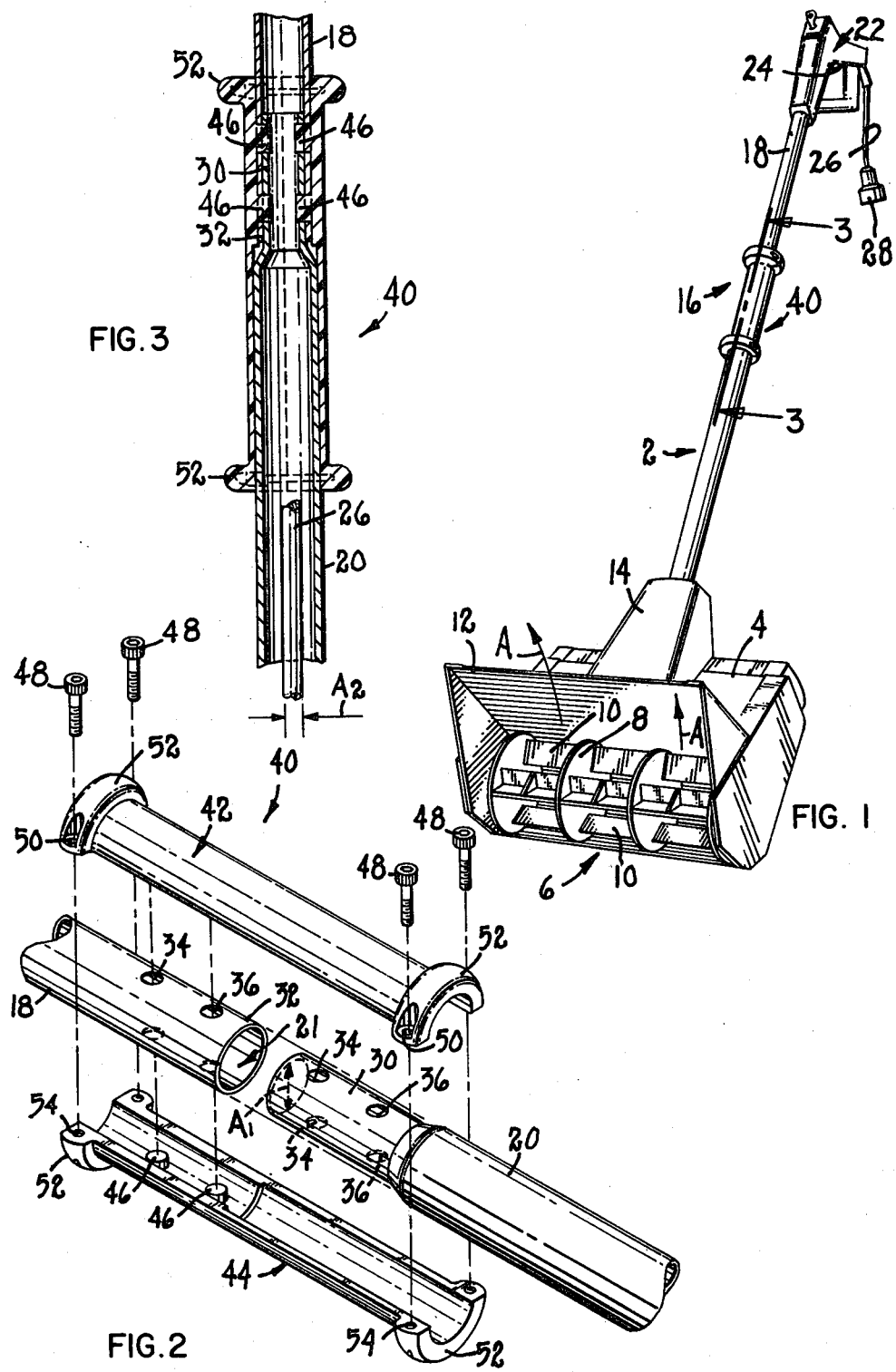

POWER EQUIPMENT UNIT WITH SPLIT HANDLE

TECHNICAL FIELD

This invention relates to an outdoor power equipment unit such as a flexible line grass trimmer or small snow thrower. More particularly, this invention relates to a power equipment unit of the hand held type having a handle assembly split in the middle to allow the handle assembly to be collapsed during shipment.

DESCRIPTION OF THE PRIOR ART

Various outdoor power equipment units are known which are hand held during use. Most of these units include a housing having some type of active power driven element. An upwardly extending handle assembly is secured to the housing. This handle assembly is long enough so that a standing operator who is holding onto the assembly can easily position the housing adjacent to or in contact with the ground. Examples of such units can include both snow throwers and grass trimmers. For example, the Power Shovel, a small lightweight hand held snow thrower, along with the entire line of flexible grass trimmers, all marketed by The Toro Company, Minneapolis, Minn. fit this description.

The handle assembly in this type of unit normally comprises upper and lower handle tubes. These tubes are disconnected during shipment of the unit to save space. However, during operation of the unit the tubes must be rigidly secured together end-to-end to provide a handle assembly of sufficient length. The handle tubes are also normally hollow having an open interior. When the power equipment unit is provided with an electrical drive motor, the power supply cord for the motor normally runs down the entire length of the handle assembly through the hollow handle tubes. This placement of the power supply cord presents certain problems in assembling the unit.

Conventionally, the upper and lower handle tubes have been provided with apertures which are aligned when the mating ends of the tubes are overlapped. Elongated threaded fasteners, such as bolts, are passed through the aligned apertures to secure the handle tubes together. However, such bolts pass through the open hollow interior of the handle tubes and present certain problems because of the interference of the power supply cord. For example, it is necessary to provide the person assembling the implement with some type of tool by which he can hold the power supply cord out of the way while the threaded fasteners are inserted. Not only does the need for such a tool slightly increase the cost of the product, but the need to manipulate the power supply cord out of the way can make the assembly of the handle tubes difficult. Moreover, there is always the risk that the threaded fasteners could somehow penetrate or severe the power supply cord creating the risk of shock to the user of the product. To avoid this the threaded fasteners can be made from an insulating material. However, this increases the cost of the fasteners and does not entirely eliminate the danger that a threaded fastener improperly applied could somehow penetrate and short out the power supply cord. Thus, the prior art methods for joining the upper and lower handle tubes together have various disadvantages.

SUMMARY OF THE INVENTION

One aspect of this invention relates to an outdoor power equipment unit of the type having a split handle assembly in which an improved means is provided for rigidly joining the upper and lower handle tubes of the handle assembly together. This joining means is operative without interfering with any component of the unit that extends down through the handle tubes.

This invention comprises a power equipment unit having a housing and an active power driven element carried on the housing for performing a ground grooming or working action. A drive means is provided for operating the active element. In addition, a handle assembly extends upwardly from the housing so as to be held by an operator who is standing when the housing is positioned adjacent to or in contact with the ground. This handle assembly includes separate upper and lower handle tubes which may be disassembled during shipment of the unit. In addition, an elongated component of the drive means extends downwardly through the handle tubes of the handle assembly and occupies a certain predetermined area of the open interior which is less than the minimum cross-sectional area of the interior. An improved means is provided for securing the handle tubes together in a rigid manner. The securing means is operative without penetrating into the minimum cross-sectional area of the open interior of the handle tubes to an extent that would interfere with the elongated component of the drive means.

BRIEF DESCRIPTION OF THE DRAWINGS

This invention will be described in detail hereafter, when taken in conjunction with the following drawings, in which like reference numerals refer to like elements throughout.

FIG. 1 is a perspective view of an improved outdoor power equipment unit according to this invention;

FIG. 2 is a partial perspective view, shown in an exploded form, of a portion of the handle assembly of the outdoor power equipment unit of FIG. 1, particularly illustrating the means for rigidly securing the upper and lower handle tubes together; and FIG. 3 is a partial cross-sectional view of a portion of the handle assembly of the outdoor power equipment unit shown in FIG. 1 taken along lines 3—3 in FIG. 1, particularly illustrating the upper and lower handle tubes secured together by the securing means.

DETAILED DESCRIPTION

Referring first to FIG. 1, an improved outdoor power equipment unit according to this invention is particularly illustrated as 2. Unit 2 includes a housing 4 which is suited to be held either adjacent to or in contact with the ground. Housing 4 includes an active element 6 that performs some type of ground grooming or working action. Since unit 2 as depicted in FIG. 1 is a snow thrower, active element 6 comprises a rotatable snow throwing rotor or impeller 8 having a plurality of snow impelling blades 10. When rotor 8 is rotating, blades 10 pick up and throw snow upwardly along a front face 12 of housing 4 generally in the direction noted by the arrows A. A drive means, generally referred to as 14, is enclosed inside a portion of housing 4. Drive means 14 preferably comprises an electrical drive motor. As described thus far, the power equipment unit 2 illustrated in FIG. 1 is identical to a product known as the Power Shovel, which has been produced and marketed by The Toro Company of Minneapolis, Minn., the assignee of the present invention.

Unit 2 also includes an upwardly extending handle assembly 16 made from upper and lower handle tubes 18 and 20 respectively placed end-to-end. Handle tubes 18 and 20 are integrally joined together by a securing means 40 that will be described in more detail hereafter. The upper end of handle assembly 16 has a control grip 22 mounted thereon which includes a switch 24 for actuating the drive means 14. In addition, an electrical power supply cord 26 having a plug 28 is provided for conducting electric current from a suitable source of such current to the drive means 14. Supply cord 26 extends downwardly through handle assembly 16 since the upper and lower handle tubes 18-20 are hollow. Tubes 18 and 20 have an open interior 21 having a minimum cross-sectional area A1 at their narrowest width. Supply cord 26 has a predetermined cross-sectional area A2 less than the area A1 of the open interior 21 of the handle tubes to allow cord 26 to be received inside tubes 18 and 20.

Lower handle tube 20 has an upper end 30 which is inwardly offset or recessed. This allows the upper end 30 to be telescopically received inside the lower end 32 of the upper handle tube 18. Handle tubes 18 and 20 are thus overlapped adjacent their mating ends in a manner common for the joining of such tubes. In addition, a first set of apertures 34 and a second set of apertures 36 are provided in the mating ends 30 and 32 of the handle tubes as shown in FIG. 2. The apertures 34 and 36 may be aligned with one another when the handle tubes 18 and 20 are slid together to provide a through passageway through the open interior of the handle assembly. Power supply cord 26 extends downwardly through the handle tubes at this point and normally would block off or at least interfere with such through passageways.

Securing means 40 comprises two semi-circular sleeves 42 and 44 adapted to be abutted together face-to-face and surround the exterior of the handle tubes 18 and 20 adjacent their overlapped mating ends 30 and 32. Sleeves 42 and 44 each have two inwardly extending lugs 46 molded on the interior thereof. Lugs 46 are adapted to extend inwardly into the aligned apertures 34 and 36 on opposite sides on the handle tubes to provide a means for longitudinally engaging securing means 40 with tubes 18 and 20. However, lugs 46 are very short and extend inwardly approximately only so far as the double thickness of material provided by the overlapped ends 30 and 32 of the handle tubes. See FIG. 3. Lugs 46 certainly do not extend substantially into the open interior 21 of the handle tubes nor do they penetrate therein so far as to interfere with the power supply cord extending downwardly therethrough. This is an important feature of the present invention.

Sleeves 42 and 44 are suitably joined together by threaded fasteners 48. Fasteners 48 extend through apertures 50 provided in semi-circular rings 52 on each end of sleeves 42 and 44. Rings 52 are enlarged, i.e. they have a diameter greater than that of the sleeves 42 and 44 themselves, to define a handle or grip therebetween. Fasteners 48 after passing through apertures 50 are then received in threaded apertures 54 in the identical rings 50 provided on sleeve 44. Fasteners 48 could comprise screws or, alternatively, bolts in which case the fasteners 48 would pass through the apertures 50 in sleeve 44 and be secured by nuts or the like tightened up to the ring 52. In effect, fasteners 48 clamp the sleeves 42 and 44 firmly to either side of the handle tubes 18 and 20 with lugs 46 extending into the aligned apertures 34 and 36. While threaded fasteners 48 have been shown herein, any other type of fastening means could be provided for tightly clamping sleeves 42 and 44 to handle tubes 18 and 20.

Screwing means 40 as disclosed herein has certain advantages. The handle tubes 18 and 20 are rigidly secured together without having any type of threaded fasteners passing into the interior of the handle tubes to interfere in any way with the power cord. Instead, the handle tubes 18 and 20 are held together from the outside thereof. While lugs 46 extend inwardly through apertures 34 and 36, they stop short of interferring with the power supply cord. Since nothing about securing means 40 interferes with power supply cord 26, the purchaser of unit 2 need not have to manipulate cord 26 during the assembly of handle tubes 18 and 20. Thus, the assembly of tubes 18 and 20 is considerably eased. Moreover, securing means 40 also forms a grip which the operator of unit 2 can hold during the operation of the unit. Typically, the operator would have one hand on the grip member 22 and the other hand on securing means 40 during operation of this type of unit.

Lugs 46 could in some instances be done away with. In this case, the gripping action provided by the joined sleeves 42 and 44 would have to be sufficiently strong to hold the handle tubes together. However, it is a requirement for such power equipment units 2 that they be able to withstand a vertical drop of a number of feet. Lugs 46 help unit 2 pass such a test since they prevent handle assembly 16 from slipping through the securing means 40. Thus, the presence of lugs 46 is preferred.

Various alternatives to the invention as disclosed herein are apparent. For example, power equipment unit 2 need not comprise a snow thrower as illustrated herein. Instead, the securing means 40 disclosed in this application would be equally effective with any type of outdoor power equipment unit having separate upper and lower handle tubes which must be secured together and in which at least some portion of the driving means or power supply means extends downwardly through the handle tubes. For example, many flexible line grass trimmers are provided with a housing which supports a rotating flexible line for trimming grass. Many of these trimmers include an electrical motor in the housing which is operated by a power supply cord extending through the handle tubes in a similar manner to that disclosed for the Power Shovel shown herein. Moreover, other types of small hand held tillers and the like have a similar handle construction and power supply cord arrangement. Certain grass trimmers are known in which an internal combustion engine is mounted at the top of the handle assembly. In this case, a flexible drive shaft for the trimmers extends downwardly through the handle assembly rather than an electrical power supply cord. However, securing means 40 would also be applicable to such a construction in terms of avoiding the interference with flexible drive shaft. Thus, the scope of this invention is to be limited only by the appended claims.

I claim:

1. An outdoor power equipment unit, which comprises:
   (a) a housing;
   (b) an active element carried on the housing for performing a ground grooming or working action;
   (c) an elongated handle assembly extending upwardly from the housing and of sufficient length to be held by an operator who is standing when the housing is positioned closely adjacent to or in contact with the ground, wherein the handle assembly comprises separate upper and lower handle tubes which are hollow to define an open interior having at least a minimum cross-sectional area, wherein the handle tubes have mating ends adjacent one another when assembled, wherein the mating ends of the handle tubes are telescopically overlapped with each end having at least one set of apertures which may be aligned with the apertures of the other overlapped end;

(d) power means for driving the active element, wherein the power means incudes an elongated component extending downwardly through the open interior of the handle assembly and having a predetermined cross-sectional area less than the minimum cross-sectional area of the open interior; and (e) means for rigidly securing the handle tubes together without penetrating into the minimum cross-sectional area of the open interior to an extent that would interfere with the elongated component of the power means, whereby the elongated component need not be manipulated out of the way of the securing means during assembly of the handle tubes, wherein the securing means comprises:

(i) two approximately semi-circular sleeves which are suited to be abutted face-to-face and when so abutted surround the mating ends of the handle tubes;

(ii) fastening means for clamping the sleeves together in a rigid manner around the handle tubes to hold the handle tubes together; and (iii) a set of inwardly projecting lugs on the sleeves which are received respectively in the apertures on opposite sides of the handle tubes, wherein the lugs are sufficiently short to extend into the apertures approximately only so far as the thickness of the overlapped ends of the handle tubes so as not to penetrate substantially into the open interior of the handle tubes.

2. An outdoor power equipment unit as recited in claim 1, wherein two such sets of apertures are provided on each handle tube along with two sets of corresponding lugs on each of the sleeves for reception in the apertures.

3. An outdoor power equipment unit as recited in claim 1, wherein the fastening means comprises threaded fasteners.

4. An outoor power equipment unit as recited in claim 3, wherein each sleeve has opposed ends with an enlarged semi-circular ring on each of the ends to define a grip between the rings, and wherein the threaded fasteners extend through the rings to secure the sleeves together.

5. An outdoor power equipment unit, which comprises:

(a) a housing;

(b) an active element carried on the housing for performing a ground grooming or working action;

(c) drive means for driving the active element;

(d) an elongated handle assembly extending upwardly from the housing and suited to be held by an operator who is standing when the housing is positioned closely adjacent to or in contact with the ground, wherein the handle assembly is split and includes two separate upper and lower tubes which may be disassembled during shipment of the unit and which may be placed end-to-end for assembly, and wherein the handle tubes have mating ends adjacent one another when assembled; and (e) means for rigidly securing the handle tubes together when placed end-to-end, wherein the securing means comprises two approximately semi-circular sleeves which are suited to be abutted face-to-face and when so abutted surround the mating ends of the handle tubes, wherein each sleeve has opposed ends with an enlarged semi-circular ring on each of the ends to define a grip between the rings, and further including threaded fasteners which extend through the rings for clamping the sleeves together in a rigid manner around the handle tubes to hold the handle tubes together.

6. An outdoor power equipment unit as recited in claim 5, wherein the securing means further includes means for preventing longitudinal movement of the securing means on the handle tubes, whereby the securing means will not slip on the handle tubes when a longitudinal force is applied.

* * * * *